Aug. 3, 1965
M. A. EGGENBERGER ETAL
3,198,954
OVERSPEED ANTICIPATION DEVICE
Filed Nov. 3, 1961
2 Sheets-Sheet 1
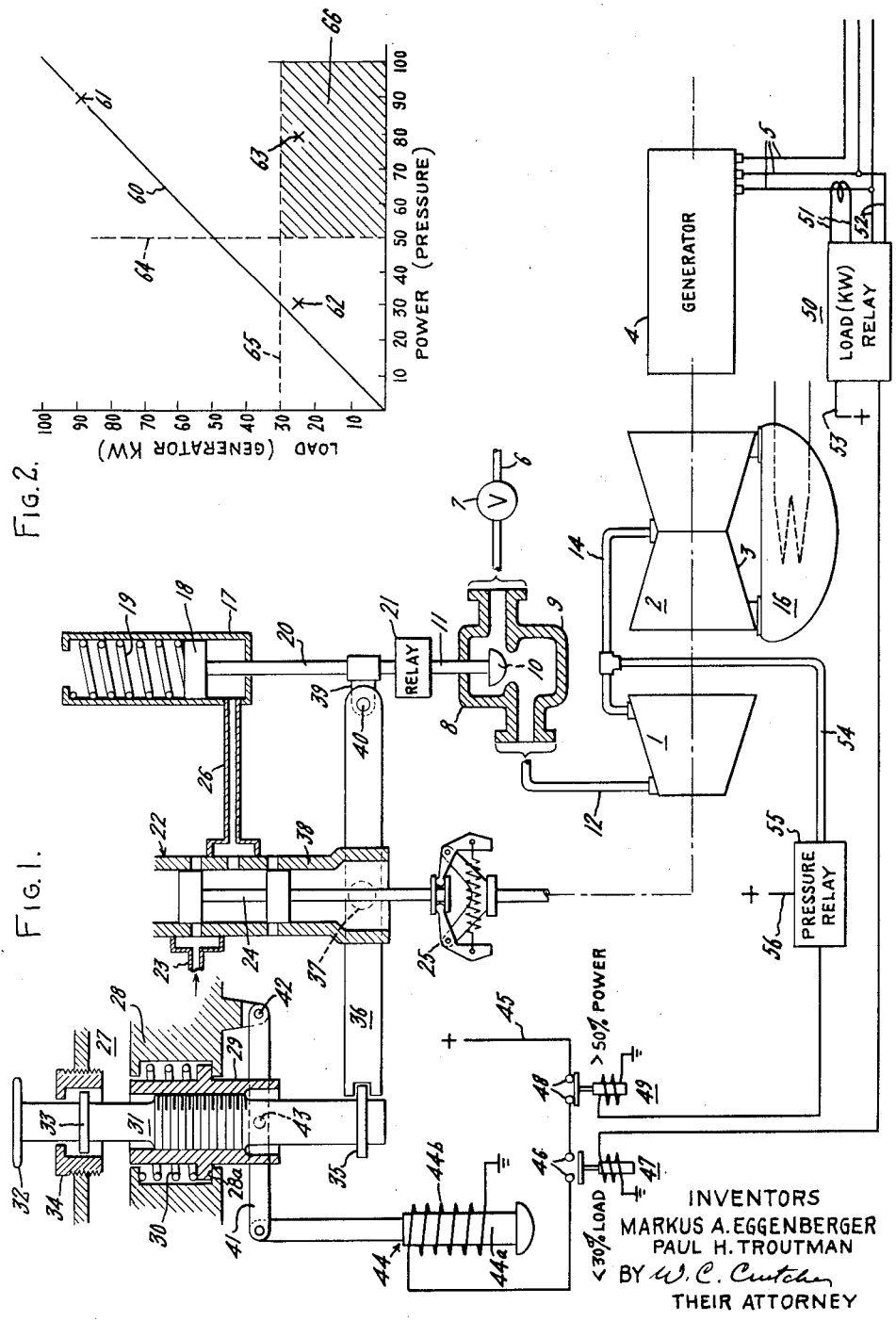
INVENTORS
MARKUS A. EGGENBERGER
PAUL H. TROUTMAN
BY W. C. Crutcher
THEIR ATTORNEY

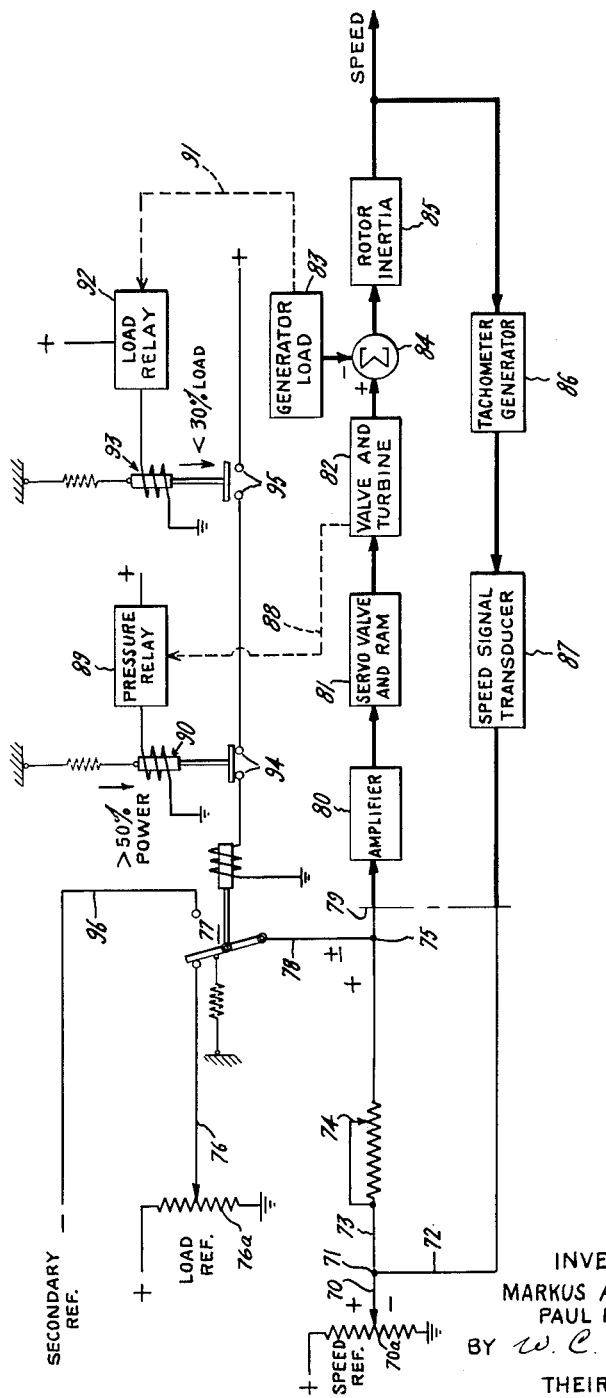

United States Patent Office 3,198,954
Patented Aug. 3, 1965

3,198,954
OVERSPEED ANTICIPATION DEVICE
Markus A. Eggenberger and Paul H. Troutman, Schenectady, N.Y., assignors to General Electric Company, a corporation of New York
Filed Nov. 3, 1961, Ser. No. 149,912
4 Claims. (Cl. 290—40)

ABSTRACT: PREDETERMINED CONDITION OF UNBALANCE BETWEEN INPUT (POWER) AND OUTPUT (LOAD) IN A TURBINE-GENERATOR ANTICIPATES POTENTIAL ROTOR OVERSPEED AND REDUCES VALVE OPENING BEFORE SIGNIFICANT SPEED CHANGE OCCURS.

This invention relates to an improved overspeed anticipation device for a prime mover supplying power to a variable load, and more particularly to an arrangement for sensing and correcting conditions which, taken cumulatively, might accelerate the prime mover beyond an acceptable speed.

Various arrangements have been suggested for anticipating increased prime mover speed. In a turbine generator, for example, where the trend is toward higher speeds of response, corrections must be made very quickly to reduce overspeed. For example, load sensing devices have been used to anticipate speed changes in the turbine by measuring changes in the electrical load, such as phase or frequency. Other proposals require an actual change from a selected reference speed before the correcting device is placed in operation.

It has also been suggested that in the case of a loss in electrical load from a turbine-driven generator, a substitute load may be placed on the generator, in order to reduce acceleration which would tend to overspeed the prime mover beyond safe limits. Such an arrangement is disclosed in application Serial No. 74,627, filed on December 8, 1960 in the names of R. C. Spencer, Jr. and M. A. Eggenberger, now U.S. Patent 3,098,190 issued July 16, 1963 and assigned to the assignee of the present application. The substitute load in that application is added when generator load is lost and when, at the same time, a certain turbine stage pressure exceeds a predetermined value. A substitute load such as this must have significant electrical rating in order to substantially reduce the acceleration, and is limited in size by economical considerations.

Ideally, excluding frictional losses, the power being delivered to a turbine by the high energy steam is in balance with the real load on the turbine at any given moment. The load is not actually the generator since, excluding its frictional and other relatively small heat losses, the generator is only a converter of energy. The real load is the power in kilowatts furnished by the turbine-driven generator to a connected electrical system. Power here is defined as the instantaneous measurement of energy per unit time actually being delivered to the various turbine blades and at various pressures within the turbine sections by the entrained steam. Load, on the other hand, is defined as the instantaneous measurement of energy per unit of time actually leaving the turbine-generator as kilowatts of electricity in the generator leads. Power in the turbine manifests itself by a forward torque on the rotors of the connected turbine and generator, whereas load manifests itself as a braking or negative torque. If there is an unbalance between the power and load torques, excluding frictional losses, there remains a net torque which will accelerate or decelerate the rotors at a rate governed by their rotational inertia. It must be emphasized that power is an instantaneous measurement which can be related to the condition of the steam present in different turbine sections. Once motive fluid has been admitted to the turbine, its energy cannot be dissipated except by supplying a real load or by changing the speed of the rotor.

It is essential, therefore, that the energy input in the form of primary steam be quickly controlled under conditions of varying load to prevent a substantial unbalance of power and load, and thereby to anticipate overspeed conditions.

Accordingly, one object of the present invention is to provide a device which anticipates overspeed of the rotor of a prime mover driving a load by sensing and correcting cumulative conditions leading to acceleration before a significant overspeed actually takes place.

Another object of the invention is to provide an improved arrangement for comparing instantaneous power of a prime mover with the actual load on the prime mover, and initiate a controlling action of the flow of motive fluid so as to reduce the unbalance before a significant speed change has taken place.

Still another object of the invention is to provide an improved device to reduce energy flow to a prime mover when the prime mover power is greater than a predetermined amount while the load at the same time is less than a predetermined amount.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings, in which:

FIG. 1 is a schematic diagram of a mechanical-hydraulic governing system for a turbine-generator employing the oversped anticipating device;

FIG. 2 is a graph illustrating the operation of the overspeed anticipating device; and FIG. 3 is a simplified block diagram of an electrohydraulic governing system for a similar turbine-generator, illustrating a modification of the overspeed anticipating device.

Briefly stated, the invention is practiced by measuring the real load on a turbine-generator (generator kw. in the embodiment shown) and the power being delivered to the turbine by the steam flowing through it (pressure in the embodiment shown), and, at a predetermined condition of unbalance, changing the load reference of the governing system to a reduced load position, so as to reduce the flow of incoming motive fluid before a significant speed change takes place due to the unbalance.

Referring to FIG. 1 of the drawing, a high-pressure steam turbine section 1, and a low-pressure section 2, are coupled in tandem to drive a generator 4. The generator supplies an output to an electrical load (not shown) by means of phase leads 5. The generator itself is not considered the load but merely transforms mechanical energy to electrical energy, and in the following discussion may be considered as a component of the prime mover. High-pressure, high-temperature primary steam enters the turbine through inlet conduit 6, passes through an open emergency stop valve 7, and is controlled by a control valve 8. It will be understood by those skilled in the art that control valve 8 represents a group of parallel-connected valves lifted in sequence. Here, however, it is shown simply as a single valve casing 9 having a disk 10 controlled by a valve stem 11. The controlled flow of steam enters high-pressure turbine 1 from control valve 8 through a pipe 12. After passing through the high-pressure turbine stages, the steam flows through a cross-over pipe 14 to low-pressure turbine section 2. From low-pressure section 2, the steam exhausts to condenser 16. Although a simple condensing steam turbine is illustrated, other steam turbine arrangements, including reheat turbines, as well as other types of prime movers, such as gas turbines, would also effectively employ the invention.

The mechanical-hydraulic governing system comprises a suitable hydraulic servo motor operating valve stem 11. As shown, it comprises a hydraulic cylinder 17 in which is disposed a single-acting piston 18, biased downward by a compression spring 19. A piston rod 20 operates valve stem 11 through a suitable hydraulic force-amplifying relay 21 indicated diagrammatically.

Flow to cylinder 17 is controlled by hydraulic pilot valve 22 furnished with a source of hydraulic fluid under pressure (not shown) through pipe 23. The two-land pilot valve stem 24 is positioned vertically in valve sleeve 38 in response to turbine speed changes by means of a mechanical fly-ball governor 25. A pipe 26 conducts the flow of hydraulic fluid from pilot valve 22 to cylinder 17.

The foregoing described elements are sufficient to comprise a simple speed-governing system where the valve disk 10 is adjusted in accordance with speed changes to hold the speed within certain limits. In order to adjust the turbine speed for various levels of load at synchronous speed, a speed changing device is employed in order to adjust the reference speed of the unit. Such a device is shown generally at 27 and comprises a stationary support 28 in which is disposed a sleeve 29, held down against an abutment 28a by a compression spring 30. The inside of sleeve 29 is threaded to receive a mating threaded rod 31, which is adjusted within collar 29 by manually turning the speed changing handwheel 32. A collar 33 and a stationary abutment 34 serve to limit the upward movement of the rod 31.

A collar 35 on the lower end of rod 31 serves as the fulcrum for a restoring lever 36. Restoring lever 36 is connected near its midpoint by pivoted connection 37 to the movable sleeve 38 of pilot valve 22. Turning speed changer handwheel 32 will, therefore, raise or lower rod 31 and the fulcrum for the left-hand end of the restoring lever 36, and therefore will adjust the vertical position of the sleeve 38. Restoring movement is given to sleeve 38 by means of a projection 39 attached to the piston rod 20 and pivoted to lever 36 as indicated at 40.

The foregoing description, with the exception of the spring-loaded sleeve 29 in the speed changing device 27, comprises a conventional mechanical-hydraulic governor with means to adjust the load reference (fulcrum collar 35) so as to refer the reference speed to some specified load which is, in preference, no load. Turning the speed changing handwheel 32 so as to lower rod 31 and fulcrum collar 35 will lower pilot valve sleeve 38 to admit hydraulic actuating fluid to cylinder 17. This serves to open control valve 8 and add load to the turbine, while it is held at a fixed speed by interconnection of the generator with a large electrical network.

According to the invention, means are provided to raise sleeve 29 against compression spring 30 from its normal seat on abutment 28a, thereby raising the fulcrum (lowering the load reference), when conditions favoring acceleration of the turbine are present. This is accomplished by a lever 41 pivoted to support 28 at 42 and connected to sleeve 29 by a pivoted connection 43. Lever 41 is connected to the plunger 44a of a solenoid 44 having an actuating coil 44b. Coil 44b, when energized, will raise solenoid plunger 44a and lever 41, moving sleeve 29 upward against compression spring 30. This serves to lower the speed/load reference, which has previously been adjusted with speed changing handwheel 32. It serves to override the position set and to move the reference fulcrum collar 35 upward so as to cause control valves 8 to move to a more closed position. This reduces steam flow to the turbine, even though the speed has not actually deviated.

Solenoid 44 is energized from a D.C. electrical source (not shown) through a lead 45 when both of two pairs of series-connected contacts 46, 48 are closed. The first pair of contacts 46 is controlled by a solenoid relay 47, while the second pair of contacts 48 is controlled by solenoid relay 49. When both the solenoid relays 47, 49 are energized, contacts 46, 48 will be closed and this will connect the lead 45 to solenoid 44 to move lever 41 upward.

Although solenoid-actuated relays are shown to close contacts 46, 48, it will be apparent that static switching methods could also be employed, where contacts 46, 48 would be replaced by suitable gating devices such as gating transistors. These will pass current when a certain bias voltage is exceeded.

Solenoid relay 47 is actuated in accordance with the real electrical load on the generator and is arranged to be energized by a suitable wattmeter relay 50 when the output of generator 4 in kilowatts furnished through phase leads 5 falls below a preselected value, such as 30% of full load. Load relay 50 is a conventional device for multiplying in-phase components of current sensed by current transformer leads 51 and voltage sensed by leads 52, thus measuring only real load as opposed to reactive load. The relay is arranged to close contacts (not shown) when the real load measured by relay 50 falls below 30% of full load. A D.C. electrical source (not shown) is supplied through lead 53 to energize solenoid relay 47 and close contacts 46 when the load relay contacts are closed.

Solenoid relay 49 is actuated when the turbine power is greater than a predetermined amount. As explained previously, the power is expended either in supplying the load or in changing the speed of the rotor or both. The instantaneous power of the turbine is proportional to the steam pressure. Therefore, the steam pressure is measured at a selected location where the proper pressure at full rated turbine power has previously been determined or calculated. The percentage of predetermined full power pressure which the measured pressure represents is therefore the percentage of full power which the turbine is developing. Here the pressure is measured by means of a pipe 54 connected to crossover line 14. Pressure measuring pipe 54 might be connected at other locations, such as any convenient interstage location, such as an extraction line. Pipe 54 is connected to a pressure-operated relay 55 which may be of any conventional type, such as a bellows which expands against atmospheric pressure to operate electrical contacts (not shown). Pressure relay 55 is arranged to connect a source of D.C. voltage (not shown) supplied through lead 56 to the solenoid relay 49 if the percentage of full turbine power, indicated by the pressure in pipe 54, is greater than a predetermined value. As shown here in the example, solenoid relay 49 is energized by pressure relay 55 to close contacts 48 when turbine power is greater than 50%.

Reference to FIG. 2 of the drawing will indicate the conditions under which the solenoid relays 47, 49 are actuated. There turbine power is plotted as percentage of full power on the horizontal axis, while load is plotted as percentage of full load on the vertical axis. A line 60 bisecting the horizontal and vertical axes represents a balanced condition between power and load, under which balanced conditions there will be no tendency for the rotor to accelerate or decelerate. For example, a point indicative at 61 on the graph shows the positive and negative torques on the rotor to be in equilibrium at fairly high values of power and load. Another point 62 indicates that the power and load are almost in equilibrium at substantially lower values of power and load. However, point 63 indicates a substantial unbalance, with the load being about the same as point 62, but with much greater power being delivered to the turbine. Condition 63 would lead to an acceleration of the rotors which would be difficult to detect immediately by conventional speed governing equipment. During the time elapsing before corrective action, high energy steam would continue to flow to the turbine.

For the example shown, pressure relay 55 (FIG. 1) is set to actuate solenoid relay 49 when the pressure represents more than 50% power or, in other words, to the right of vertical line 64 in FIG. 2. Similarly, load relay 50 (FIG. 1) is set to energize solenoid relay 47 if the load is less than 30%, or below a horizontal line 65 in FIG. 2. If these events occur at the same time, this would be represented by the shaded area 66, containing point 63. Therefore, if power and load conditions were such that they could be represented by point 63, both contacts 46, 48 would close, energizing solenoid 44 and moving synchronizing rod 31 upward. This in turn would cause the valves to move in a closing direction, immediately reducing steam flow to the turbine.

The length of travel of solenoid 44 is selected with relation to the lengths of levers 41, 36, so that the valve sleeve 38 moves by at least an amount corresponding to the speed change required to give a full valve closing stroke. In other words, if a 5% speed change on governor 25 produces a full valve closing stroke, the movement of the pilot valve sleeve 38 when solenoid 44 is energized should be at least the same distance that the stem 24 of pilot valve 22 would move for a 5% speed change.

The invention is by no means limited to the mechanical-hydraulic system shown in FIG. 1. FIG. 3 indicates a simplified block diagram of the invention applied to an electro-hydraulic governing system for a steam turbine driving a generator. The electrical and hydraulic components for such a system may be as disclosed in copending application Serial No. 80,290 filed in the names of M. A. Eggenberger, P. H. Troutman, and Josef J. Sauter on January 3, 1961, or Patent No. 3,097,488, July 16, 1963 filed in the names of M. A. Eggenberger, P. H. Troutman, and P. C. Callan, or as disclosed in U.S. Patent 2,977,768 issued to J. B. Wagner et al. on April 4, 1961. All of the foregoing are assigned to the assignee of the present application.

In simplified block diagram form, an electric potential representing a desired turbine speed is furnished in lead 70 from potentiometer 70a and summed at junction 71 with a negative speed feedback electric potential appearing in lead 72 and representative of turbine actual speed. The resulting speed error signal appears in lead 73 and is modified by a factor representative of desired speed regulation in rheostat 74 and furnished to a second summing junction 75. An electric potential representative of a desired actual load on the turbine is furnished from a load reference potential source through potentiometer 76a and lead 76, through the contacts of solenoid switch 77 to lead 78, where it is superimposed on the speed error signal. The remaining portion of the system, shown to the right of line 79, is indicated in simplified schematic form. The resulting modified speed error/load signal is amplified at 80, and serves to furnish a positioning signal for a servo valve and hydraulically-actuated ram represented by block 81. The ram positions a steam valve which controls the flow of steam to a turbine, both represented by block 82.

A representation of generator load is indicated by block 83 furnishing a negative or breaking torque as indicated by the minus input to a summer 84. Summing device 84 is actually a symbolic representation of the balance existing in the rotating members subjected to opposite torques due to load and power. The net unbalanced torque will serve to accelerate or change the speed of the rotor, indicated by rotor inertia block 85. Speed change of the rotor is sensed by a tachometer generator and converted into an electric potential representative of actual turbine speed by a suitable transducer 87. It is obvious that for a new speed error signal to be produced in lead 73 to change the valve position, an actual speed change must take place.

The foregoing block diagram is actually a hybrid diagram of representations of actual components and representations of physical and mathematical properties of the system. The heavy flow lines indicate functional relationships between components of the system, while the light lines indicate actual portions of the electrical circuit. It will be understood that the system might take other forms and is only intended to illustrate the application of the overspeed anticipating device to this type of system.

According to the invention, unbalanced load and power which will tend to accelerate the rotor are sensed before significant speed change actually takes place. As described in connection with FIG. 1, a condition of the motive fluid indicative of the turbine power is sensed, as indicated by dotted line 88 connected to the turbine block 82. This may conveniently be a pipe connected to measure steam presure at some point in the turbine. The steam pressure operates pressure relay 89, which is similar to the pressure relay 55 described in connection with FIG. 1. Relay 89 is arranged to close electrical contacts for pressures representing greater than 50% power, so as to energize the solenoid relay 90.

Also as described in connection with FIG. 1, the real load (kilowatts supplied to the electrical system) is sensed as indicated by dotted line 91 operating a load relay 92 of the wattmeter type, similar to relay 50 in FIG. 1. Relay 92 is arranged to close internal contacts when the load is below a predetermined value such as 30%. When this occurs, the internal contacts (not shown) will energize solenoid relay 93.

When both solenoid relays 90, 93 are energized, the series-connected contacts 94, 95 of relays 90, 93 respectively connect a source of electric potential (not shown) to the coil of solenoid switch 77 moving it to the right, as will be apparent from the drawing. The right-hand contact of solenoid switch 77 is connected by lead 96 to a secondary source of electric potential which is lower than the potential for the load reference furnished through lead 76. The secondary reference may be zero potential, it may be simply lower than the load reference potential, or it may be a minus potential as indicated. The secondary reference is selected to reduce the signal superimposed on the speed reference by at least the amount of the valve (opening signal) in order to produce a full closing signal on the valves as before.

By a comparison of FIG. 1 with FIG. 3, it will be seen that the selected load reference potential in lead 76 of FIG. 3 corresponds to the vertical height of the fulcrum collar 35 adjusted by the speed changing handwheel 32 of FIG. 1. Actuation of solenoid switch 77 to reduce the potential supplied to summing device 79 in FIG. 3 corresponds to the lifting of fulcrum collar 35 by means of the solenoid 44 in FIG. 1.

Operation of the overspeed anticipating device is essentially the same, whether applied to the mechanical-hydraulic control system of FIG. 1 or the electro-hydraulic control system of FIG. 3. In both cases, the conditions tending to accelerate the rotor, i.e. unbalance between the turbine power and the real load on the turbine-generator, serves to adjust the load reference. When a preselected unbalanced condition exists, such as greater than 50% turbine power, and also less than 30% load delivered by the generator, both relays are closed to energize a third relay or solenoid-operated linkage to lower the load reference by an amount sufficient to obtain a full closing signal of the valve. No actual speed change of the rotor is required, so that the time required to take the corrective action depends only upon the time lag in the overspeed anticipating device itself.

It will be apparent that equivalent static switching circuits can be used instead of the mechanical relays shown, and that they can be arranged to select the type of unbalanced condition desired to lower the load reference. For example, summing amplifiers could be used so that a fixed difference between power and load would anticipate overspeed. In this case, the shaded area 66 in FIG. 2 would be triangular rather than rectangular.

It will also be apparent to those skilled in the art that the overspeed anticipating device is not limited to use on the particular type of power plant or the particular type of governing systems illustrated, but is capable of application to other types of prime movers.

The only requirement is that, considering the prime mover (hence the turbine and generator together) as an isolated energy-conversion system with rotating parts, a condition indicative of the rate of energy entering the system can be compared with a condition indicative of the rate of energy leaving the system. The difference in energy rates or powers, exclusive of frictional and heat losses, will serve to accelerate or decelerate the rotating parts. The comparison of the incoming energy rate with the outgoing energy rate is used to adjust the means controlling the incoming energy rate before this unbalance in power actually causes a speed change to take place, thus anticipating such a change.

It is desired to cover in the appended claims all such modifications as fall within the true spirit and scope of the invention.

What we claim as new and desire to secure by Letters Patent of the United States is:

1. Overspeed anticipating device for a prime mover driving a generator supplying an electrical load, said prime mover and generator both having rotors, comprising:
   valve means controlling the flow of motive fluid to said prime mover,
   speed responsive means connected to operate said valve means to hold the prime mover and generator at a selected operating speed,
   load reference means cooperating with said speed responsive means for increasing the opening of said valve means beyond that effected by said speed responsive means to control the rate of energy flow to the prime mover for applying load to the generator at said selected speed,
   first means responsive to a condition of the motive fluid in said prime mover indicative of prime mover instantaneous power,
   second means responsive to the instantaneous real load on said generator, the difference between power and load measured by said first and second means providing energy to accelerate or decelerate the rotors, and
   means reducing the valve opening effect of said load reference means when the first and second means together indicate a pre-selected condition of power and load unbalance, whereby the flow of energy to the prime mover is adjusted before significant rotor speed change takes place.

2. Overspeed anticipating device for a turbine driving a generator supplying an electrical load, said turbine and generator both having rotors, comprising:
   valve means controlling the flow of motive fluid to said turbine,
   speed responsive means connected to operate said valve means to hold the turbine and generator at a desired operating speed,
   load reference means cooperating with said speed responsive means to cause additional opening of said valve means at the desired operating speed, whereby additional motive fluid is supplied to the turbine to apply load to the generator at the desired operating speed,
   first means responsive to the pressure of the motive fluid flowing through said turbine after it has passed through said valve means,
   second means responsive to the real power supplied by said generator to the electrical load, and
   means reducing the valve opening effected by said load reference means when the prime mover motive fluid pressure sensed by said first means is greater than a preselected amount at the same time that the real power supplied by the regenerator sensed by said second means is less than a preselected amount, whereby said valve means will receive a closing signal before significant speed change of the turbine and generator rotors takes place.

3. An overspeed anticipating device for a steam turbine connected to drive a generator supplying an electrical load, said steam turbine and generator both having rotors with substantial rotational inertia, comprising:
   valve means controlling the admission of steam to the turbine,
   speed governor means responsive to turbine speed,
   hydraulic servo means connected to be operated by said speed responsive means so as to position the valve means to hold a desired operating speed, said servo means including a restoring lever having an adjustable fulcrum,
   speed changing means to adjust the fulcrum of said restoring lever for the purpose of causing additional opening of the valve means to add load to the generator at the desired operating speed,
   first means responsive to the pressure of the steam flowing through said turbine after it has passed said valve means,
   second means responsive to the real power supplied by the generator to the electric load,
   means actuated by said first and second means to move the fulcrum of said speed changing means toward a valve closing position when the steam pressure sensed by the first means is greater than a preselected value at the same time that the generator load sensed by the second means is less than a preselected value, whereby the flow of steam to the turbine is reduced before significant rotor speed change takes place.

4. Overspeed anticipating device for a steam turbine driving a generator supplying an electrical load, said turbine and generator both having rotors with substantial rotational inertia, comprising:
   valve means controlling the admission of steam to said turbine,
   means supplying a first electric potential representative of a desired operating speed of the turbine,
   speed responsive means providing a second electric potential representing actual turbine speed,
   means comparing said first and second potentials to provide a third electric potential representing speed error,
   electro-hydraulic servo means positioning said valve means in response to said third electric potential to hold a desired operating speed,
   means supplying a fourth load reference potential representative of desired load on the turbine,
   means supplying a fifth electric potential of a lesser magnitude than said fourth potential,
   switching means connected to superimpose either said fourth or said fifth potential on said third potential,
   means responsive to the pressure of the steam flowing through said turbine after it has passed through said valve means,
   means responsive to the real load on said generator, and
   means connected to actuate said switching means so as to disconnect said fourth potential and to connect said fifth lower potential when the steam pressure sensed by said pressure responsive means is above a preselected value at the same time that the load sensed by said real load responsive means is below a preselected value, whereby said valve means will move in a closing direction to reduce the flow of steam to the turbine before a significant rotor speed change takes place.

References Cited by the Examiner

UNITED STATES PATENTS

| | | | |
|---|---|---|---|
| 1,752,135 | 3/30 | Bryant | 290—40.3 |
| 1,779,419 | 10/30 | Wunsch | 290—40.3 |

MILTON O. HIRSHFIELD, *Primary Examiner.*